United States Patent
Blahak et al.

[11] B 3,991,023
[45] Nov. 9, 1976

[54] POLYURETHANES WHEREIN THE CHAIN-LENGTHENING AGENTS ARE BENZOIC ESTER DIAMINES

[75] Inventors: Johannes Blahak, Cologne; Erwin Müller; Uwe Döbereiner, both of Leverkusen; Wolfgang Ebner, Opladen; Helmut Kleimann, Leverkusen, all of Germany

[73] Assignee: Bayer Aktiengesellschaft, Leverkusen, Germany

[22] Filed: Nov. 29, 1974

[21] Appl. No.: 528,303

[44] Published under the second Trial Voluntary Protest Program on February 10, 1976 as document No. B 528,303.

Related U.S. Application Data

[63] Continuation of Ser. No. 307,739, Nov. 17, 1972, abandoned.

[30] Foreign Application Priority Data

Dec. 7, 1971   Germany............................ 2160589

[52] U.S. Cl. ...................... 260/18 TN; 260/2.5 AZ; 260/75 NH; 260/471 R

[51] Int. Cl.$^2$................. C07C 101/68; C08G 18/32
[58] Field of Search................ 260/77.5 AM, 75 NH

[56] References Cited
UNITED STATES PATENTS 3,681,290   8/1972   Meckel et al............... 260/77.5 AM
3,794,621   2/1974   Meckel et al............... 260/77.5 AM

*Primary Examiner*—H.S. Cockeram
*Attorney, Agent, or Firm*—Joseph C. Gil; Gene Harsh

[57]   ABSTRACT

Polyurethane resins are provided, which polyurethanes are chain extended with ester diamines of the formula

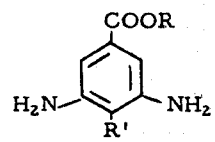

wherein R is $C_1$ to $C_{20}$ alkyl radical and R' is a $C_1$ to $C_{10}$ alkyl radical.

2 Claims, No Drawings

POLYURETHANES WHEREIN THE CHAIN-LENGTHENING AGENTS ARE BENZOIC ESTER DIAMINES

This is a continuation of application Ser. No. 307,739, filed Nov. 17, 1972, now abandoned.

This invention relates to polyurethane elastomers and more particularly to polyurethane elastomers that are chain extended by aromatic ester amine derivatives of benzoic acid and further relates to novel aromatic ester amine derivatives of benzoic acid.

Aromatic ester amine derivatives of benzoic acid are known to the art and are described for example in German Offenlegungsschriften No. 1,803,635; 1,940,363; 2,003,706; Belgian Pat. No. 767,746 and U.S. Pat. No. 3,681,290. The ester diamines described therein are derivatives of 4-halo-, 4-alkoxy-, 4-H-3,5- and 2,4-diamino-benzoic acids. When employed as chain lengthening agents for polyurethane elastomers, these diamines enable one to prepare high quality elastomeric polyurethanes.

However, a major disadvantage of using said ester diamines is that relatively long molding times are required, especially in reaction mixtures containing aliphatic diisocyanates, hence short molding cycles cannot be attained and high speed molding apparatus cannot be used at maximum efficiency.

It is therefore an object of this invention to provide polyurethane resins devoid of the disadvantages of the prior art. It is another object of this invention to provide novel chain lengthening agents for polyurethane plastics. It is a further object of this invention to provide polyurethane resins which require shorter molding times. The foregoing objects and others, which will become apparent from the following description are accomplished in accordance with the invention generally speaking by providing polyurethane or polyurea resins containing structural units of formula

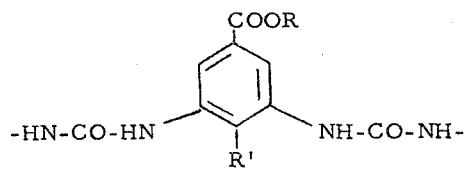

wherein
R is a linear or branched alkyl radical containing 1 to 20 carbon atoms and which may contain heteroatoms, preferably oxygen or sulphur; and
R' is a branched or straight-chain alkyl radical containing 1–10 carbon atoms.

The preferred polyurethane or polyurea resins according to the invention are those containing structural units of the above formula wherein
R is a linear or branched $C_1$ to $C_8$ alkyl radical, which may contain heteroatoms, preferably oxygen; and
R' is a linear or branched $C_1$ to $c_4$ alkyl radical.

The invention also relates to a process for the production of polyurethane resins comprising reacting polyhydroxyl compounds which have a molecular weight of from about 800 to about 5,000 with diisocyanates and with aromatic diamines as chain-lengthening agents, wherein the diamines have the following formula:

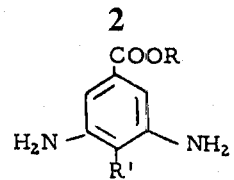

wherein R and R' have the meanings given above.

The invention further relates to novel diamines of the above formula wherein R is a linear or branched alkyl radical containing 4 to 8 carbon atoms which may contain heteroatoms and R' is a linear or branched alkyl radical containing 1 to 4 carbon atoms, some examples of which are:

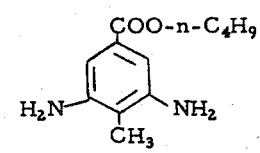

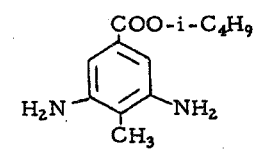

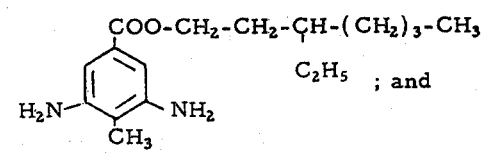

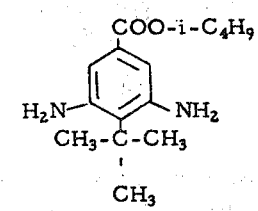

The invention also provides a novel diamine of the following formula

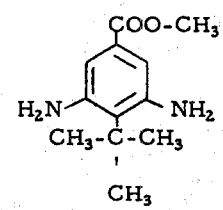

Some additional examples of diamines according to the invention are:

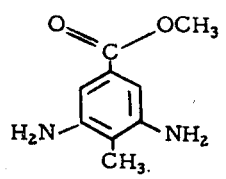 ;
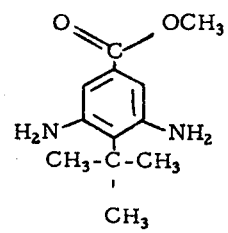 ;

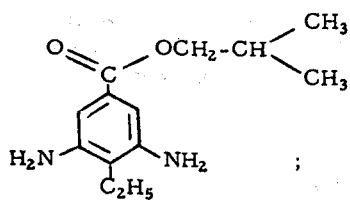 ;
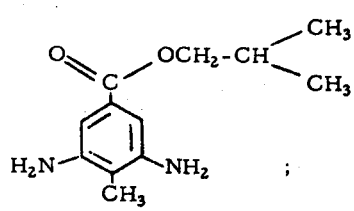 ;

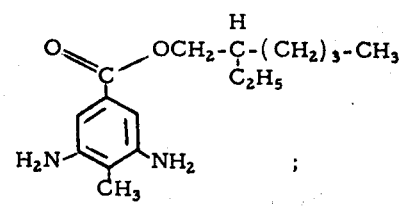 ;
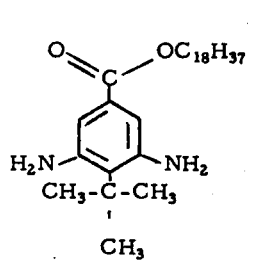 ;

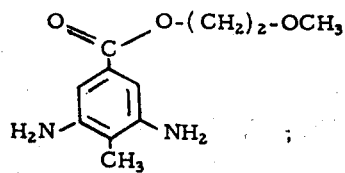 ;
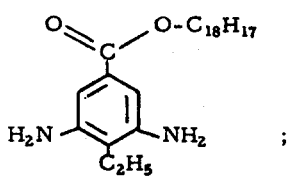 ; and

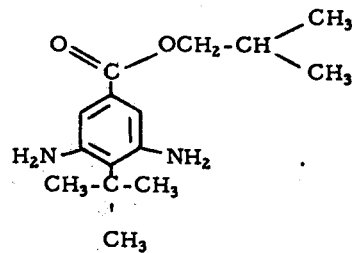 .

The use of the chain-lengthening agents according to the invention is further suprising in that apart from reducing the molding time, it is the structure of the 4-alkyl-3,5-diamino-ester group which specifically effects a very marked increase in the elastic properties and improvement in the quality of the polyurethane elastomers. This effect is particularly marked when the structure is that of a 4-methyl-3,5-diamino-benzoic acid ester, which is the preferred structure according to the invention.

The diamines used according to the invention are prepared by known methods, for example 4-methyl-3,5-diamino-benzoic acid, may be obtained by direct nitration of p-toluic acid followed by esterification and the resulting 4-methyl-3,5-dinitro-benzoic acid ester is reduced catalytically with Raney nickel.

The yields are generally in the range of from about 80% to about 95%. The amines obtained are crystalline or oily products the melting points of which are largely dependent upon the alkyl radical or the ester groups.

The starting materials used for the polyurethanes according to the invention may be conventional polyhydroxyl compounds having a molecular weight of from about 800 to about 5,000, for example linear or slightly branched polyesters having terminal hydroxyl groups which may be prepared by known manner, for example from monofunctional or polyfunctional alcohols and carboxylic acids or hydroxy carboxylic acids, to which amino alcohols, diamines, hydroxylamines or diamino alcohols may be added. These polyesters may also contain double or triple bonds of unsaturated fatty acids. Linear or slightly branched polyethers which may be obtained by the polymerization of alkylene oxides such as ethylene oxide, propylene oxide, epichlorohydrin or tetrahydrofuran are also suitable. Copolymers of this type may also be used. Other suitable starting materials include linear or branched addition products which may be obtained by the addition of the above mentioned alkylene oxides, for example, to polyfunctional alcohols, amino alcohols or amines. The following are mentioned as examples of polyfunctional starting components for the addition reaction of the alkylene oxides: ethylene glycol, 1,2-propylene glycol, hexane-1,6-diol, ethanolamine and ethylene diamine; a certain amount of trifunctional starting components such as trimethylolpropane, glycerol, sorbitol or cane sugar may also be included. Mixtures of various types of linear and/or slightly branched polyalkylene glycol ethers may, of course, also be used. Polyacetals, polythioethers or polycarbonates or mixtures of various compounds which contain at least two OH groups and havee a molecular weight of from about 800 to about 5,000 may be used. It is often preferred to use exclusively or predominantly difunctional hydroxyl compounds.

Known aliphatic, cycloaliphatic, araliphatic or aromatic polyisocyanates may be used as the starting components for carrying out the process of the invention, for example tetramethylene-1,4-diisocyanate, hexamethylene-1,6-diisocyanate, dodecane-1,12-diisocyanate, cyclohexane-1,3- and -1,4-diisocyanate and any mixtures of these isomers, 1-isocyanato-3,3,5-trimethyl-5-isocyanatomethylcyclohexane, phenylene-1,3- and -1,4-diisocyanate, tolylene-2,4- and -2,6-diisocyanate and any mixtures of these isomers, hexahydrotolylene-2,4- and -2,6-diisocyanate and any mixtures of these isomers, diphenylmethane-4,4'-diisocyanate, napthylene-1,5-diisocyanate, triphenylmethane-4,4',4''-triisocyanate, polyphenyl-polymethylene polyisocyanates which may be obtained by aniline-formaldehyde condensation followed by phosgenation, polyisocyanates containing carbodiimide isocyanate adducts as described in German patent specification No. 1,092,007; the diisocyanates described in US Pat. No. 3,492,330; polyisocyanates containing allophanate groups as described in British patent specification No. 994,890; Belgian patent specification No. 761,626 and published Dutch patent application No. 7,102,524; polyisocyanates containing isocyanurate groups as described in German patent specification No. 1,022,789 and 1,027,394 and in German offenlegungsschriften No. 1,929,034 and 2,004,048; polyisocyanates which contain biuret groups as described in German patent specification No. 1,101,394, in British patent specification No. 889,050 and in French patent specification No. 7,017,514, polyisocyanates prepared by telomerization reactions as described in Belgian patent specification No. 723,640; polyisocyanates containing ester groups according to British patent specification No. 956,474 and 1,072,956; aliphatic, cycloaliphatic, araliphatic or aromatic polyisocyanates described by W. Siefken in Justus Liebig's Annalen der Chemie, 562, pages 75 to 136; reaction products of the above mentioned isocyanates with acetals in accordance with German patent specification No. 1,072,385; and the isocyanates described in German patent specification Nos. 1,022,789 and 1,027,394.

Any mixtures of the above mentioned polyisocyanates may, of course, also be used.

It is generally preferred to use the commercially readily available polyisocyanates such as tolylene-2,4- and -2,6-diisocyanate and any mixtures of these isomers or polyphenyl-polymethylene polyisocyanates which may be prepared by aniline-formaldehyde condensation followed by phosgenation.

The quantity of reactants used is generally chosen so that the molar ratio of polyisocyanates to chain-lengthening agents plus compounds containing reactive OH-groups is generally between about 0.9 to about 1.5, preferably between about 1.05 to about 1.25, depending on the particular process employed. If the polymer is produced via a prepolymer stage, the percentage NCO-content in the prepolymer may be between about 1% to about 6%. The molar ratio of reactive hydrogen in the chain-lengthening agent to reactive OH-groups may vary within wide limits but should generally be between about 0.4 to about 1.5, the products obtained varying from soft to hard according to the choice. The molar fraction of amine in the chain-lengthening agent should be between about 1 to about 0.5, preferably between about 1 to about 0.8.

The process according to the invention may be carried out by various methods, for example the compound which contains at least two hydroxyl groups may be reacted with an excess of diisocyanate and the melt may then be poured into molds after the addition of chain-lengthening agent. After several hours re-heating, a high-quality elastic polyurethane resin is obtained.

Another method consists in mixing the higher molecular weight compound which contains at least two hydroxyl groups with the chain-lengthening agent used according to the invention and reacting the mixture with an excess of diisocyanate, granulating the reaction product and then molding the granulate in the heat under pressure. Polyurethane resins with varying degrees of hardness and elasticity may be obtained by this method according to the proportions of reactants employed. Synthetic resins which can be processed like thermoplasts are obtained in this way. Another method consists in reacting a mixture of the higher molecular weight compound which contains at least two hydroxyl groups and the chain-lengthening agent used according to the invention with a subequivalent amount of diisocyanate to produce a rollable sheet which may then be converted into a rubbery elastic polyurethane resin at the next stage, for example, by cross-linking with an additional quantity of diisocyanate.

The products according to the invention may be used for a variety of molded products which are subjected to severe mechanical wear, such as, for example, rollers and cone belts.

Chain-lengthening may also be carried out in the presence of blowing agents, preferably in closed molds, in which case foams which have a cellular core and a non-cellular surface are formed.

The invention is further illustrated by the following examples in which all parts and percentages are by weight unless otherwise specified.

PREPARATION OF THE STARTING MATERIAL:

a. Methyl ester of 4-methyl-3,5-diamino-benzoic acid

About 452 parts of 4-methyl-3,5-dinitro-benzoic acid are suspended in about 1500 parts by volume of methanol and about 50 parts of gaseous hydrogen chloride are introduced at reflux temperature. Esterification is effected by boiling the reaction mixture for about 8 hours. The ester is then cooled to about 50°C. with ice and the precipitated crystals are suction-filtered and washed with about 100 parts by volume of methanol.

Melting point: 86°C. Yield: about 91% of theoretical.

About 440 parts of the methyl ester of 4-methyl-3,5-dinitro-benzoic acid are hydrogenated in about 1600 parts by volume of methanol in the presence of about 60 parts of Raney nickel "B". The catalyst is filtered off and the methanol evaporated.

Melting point: 126°C. Yield about 92% of theoretical.

The following ester amines are obtained in an analogous manner:

b. Ethyl ester of 4-methyl-3,5-diamino-benzoic acid
Melting point: 142° – 144°C.
c. Butyl ester of 4-methyl-3,5-diamino-benzoic acid
Melting point: 100°C.
d. Isobutyl ester of 4-methyl-3,5-diamino-benzoic acid
Melting point: 87° – 88°C.
e. 2-ethyl-hexyl ester of 4-methyl-3,5-diamino-benzoic acid
Melting point: 45°–46°C.
f. Methyl ester of 4-tertiary butyl-3,5-diamino-benzoic acid
Melting point: 81°C.
g. Isobutyl ester of 4-tertiary butyl-3,5-diamino-benzoic acid
Melting point: 80°C.

EXAMPLE 1

About 9.5 parts of the isobutyl ester of 4-methyl-3,5-diamino-benzoic acid, (d), are added to about 100 parts of a prepolymer of a polyester of adipic acid and ethylene glycol (OH-number 56) and tolylene-2,4-diisocyanate (3.78% NCO) at about 100°C. (resulting coefficient 1.03). The reaction mixture is homogenized within about 5 seconds and poured into a preheated mold. The casting is complete in about 15 seconds. The product can be removed from the mold after about 1 minute and has the following mechanical properties after tempering for about 24 hours at about 110°C.:

| | | |
|---|---|---|
| Tensile strength (rod) | DIN 53 504 | : 530 kg/cm$^2$ |
| Elongation at break | DIN 53 504 | : 555 % |
| Tear propagation resistance | | : 41 kg/cm |
| Shore hardness A | DIN 53 505 | : 91 |
| Elasticity | DIN 53 512 | : 37 % |

EXAMPLES 2 – 4

The procedure is as described in Example 1 except that
2. 7.7 parts of the methyl ester of 4-methyl-3,5-diamino benzoic acid, (a), are used.
3. 8.3 parts of the ethyl ester of 4-methyl-3,5-diamino benzoic acid, (b), are used.
4. 11.9 parts of the 2-ethyl-hexyl ester of 4-methyl-3,5-diamino-benzoic acid, (e), are used.

Elastomers having the following physical properties are obtained:

EXAMPLE 5

The procedure is as described in Example 1 except that about 9.5 parts of the methyl ester of 4-tertiary butyl-3,5-diamino-benzoic acid, (f), are used. An elastomer having the following mechanical properties is obtained:

| | | |
|---|---|---|
| Tensile strength (rod) | DIN 53 504 | : 519 kg/cm$^2$ |
| Elongation at break | DIN 53 504 | : 628 % |
| Tear propagation resistance | | :35 kg/cm |
| Shore hardness A | DIN 53 505 | : 83 |
| Elasticity | DIN 53 512 | : 38 % |

EXAMPLE 6

About 2 parts of isophorone diisocyanate (1-isocyanato-3,3,5-trimethyl -5-isocyanatomethyl-cyclohexane) and about 16.6 parts of the isobutyl ester of 4-methyl-3,5-diamino-benzoic acid, (d), are added to about 200 parts of a prepolymer of a polyester of adipic acid and ethylene glycol (OH-number 56) and isophorone diisocyanate (2.9% NCO). After homogenizing the reaction mixture for about 45 seconds, it is poured into a heated mold and heated for about 24 hours at about 110°C. An elastomer having the following properties is obtained:

| | | |
|---|---|---|
| Tensile strength (ring) | DIN 53 504 | : 384 kg/cm$^2$ |
| Elongation at break | DIN 53 504 | : 675 % |
| Structural resistance | | : 53 kg |
| Shore hardness A | DIN 53 505 | : 75 |
| Elasticity | DIN 53 512 | : 35 % |

EXAMPLE 7

About 9.6 parts of melted methyl ester of 4-methyl-3,5-diamino-benzoic acid, (a), are added to about 100 parts of a prepolymer of polytetrahydrofuran (OH-number 56) and isophorone diisocyanate (4.29% NCO) at about 120°C. The mixture remains pourable for about 105 seconds and can be removed from the mold after about 20 minutes. The mechanical properties after heating for about 24 hours at about 110°C. are as follows:

| | | |
|---|---|---|
| Tensile strength (rod) | DIN 53 504 | : 435 kg/cm$^2$ |
| Elongation at break | DIN 53 504 | : 600 % |
| Tear propagation resistance | | : 25 kg/cm |
| Shore hardness A | DIN 53 505 | : 77 |
| Elasticity | DIN 53 512 | : 43 % |

EXAMPLE 8

The procedure is as the one described in Example 7 except that about 8.9 parts of the methyl ester of 4-tertiary butyl-3,5-diamino-benzoic acid, (f), are used. The time during which the mixture remains pourable and

| | | | Examples | | |
|---|---|---|---|---|---|
| | | | 2 | 3 | 4 |
| Tensile strength (rod) | DIN 53 504 | kg/cm$^2$ | 548 | 561 | 514 |
| Elongation at break | DIN 53 504 | % | 568 | 594 | 609 |
| Tear propagation resistance | | kg/cm | 44 | 41 | 40 |
| Elasticity | DIN 53 512 | % | 40 | 38 | 35 |
| Shore Hardness | DIN 53 505 | | 92 | 91 | 85 | the time required in the mold are about 3 times as long as those in Example 7. The mechanical properties are as follows:

| | | |
|---|---|---|
| Tensile strength (rod) | DIN 53 504 | : 270 kg/cm² |
| Elongation at break | DIN 53 504 | : 520 % |
| Tear propagation resistance | | : 14 kg/cm |
| Shore hardness A | DIN 53 505 | : 70 |
| Elasticity | DIN 53 512 | : 43 % |

EXAMPLE 9

Component A

About 100 parts of the 2-ethyl-hexyl ester of 3,5-diamino-4-methyl-benzoic acid, (e);
about 2 parts of silicone stabilizer;
about 4 parts of N-methyl-N'-[β-dimethylaminoethyl] piperazine; and
about 10 parts of monochlorotrifluoromethane.

Component B

About 208 parts of a reaction product of about 2 mols of hexamethylene diisocyanate and about 1 mol of dipropylene glycol (NCO : 14.2%);
about 52 parts of a reaction product of about 4 mols of 2,4-(2,6)-diisocyanatotoluene (80 : 20% by weight), about 1 mol of polyether (consisting of propylene glycol and propylene oxide, OH-number 112) and about 1 mol of a polyether based on propylene glycol and propylene oxide/ethylene oxide (87% by weight/13% by weight), OH-number 28 (NCO : 3.5%); and
about 20 parts of monochlorotrifluoromethane.

Components A and B are vigorously mixed for about 10 seconds using a high-speed stirrer (2400 revs. per min.) and poured into heated metal mold. The NCO content of the mixture A plus B is about 12.2%.
The temperature of the mold is about 60°C.

The synthetic resin mixture starts to foam after about 20 seconds and sets after about a further 25 seconds.

The molded product is removed from the mold after about 10 minutes. The molded product has an overall gross density of about 0.70 g/cm³ and a thickness of about 10 mm with a non-cellular marginal zone on both sides.

Mechanical properties of the synthetic resin produced

Flexural strength according to DIN 53 423 : 123 kg/cm²
E-modulus according to bending tests: 2,200 kg/cm²
Elongation at break according to tension test: 87%

Dimensional stability under heat in use under bending stress in accordance with DIN 53 424: bending stress approximately 3 kg/cm² at 10 mm deflection at 76°C.

Although the invention is described in considerable detail in the foregoing Examples it is to be understood that the Examples are presented solely for purposes of illustration and that many variations may be made therein by those skilled in the art without departing from the spirit and scope of the invention.

What is claimed is:

1. Polyurethane resins containing structural units of the formula:

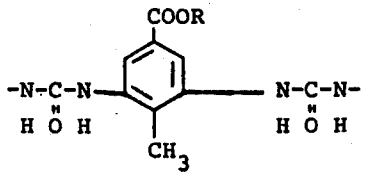

wherein R is a linear or branched $C_1$ to $C_{20}$ alkyl radical which may contain oxygen or sulphur.

2. The polyurethane resins of claim 1, wherein R is a linear or branched $C_1$ to $C_8$ alkyl radical.

* * * * *